United States Patent Office 2,772,753
Patented Dec. 4, 1956

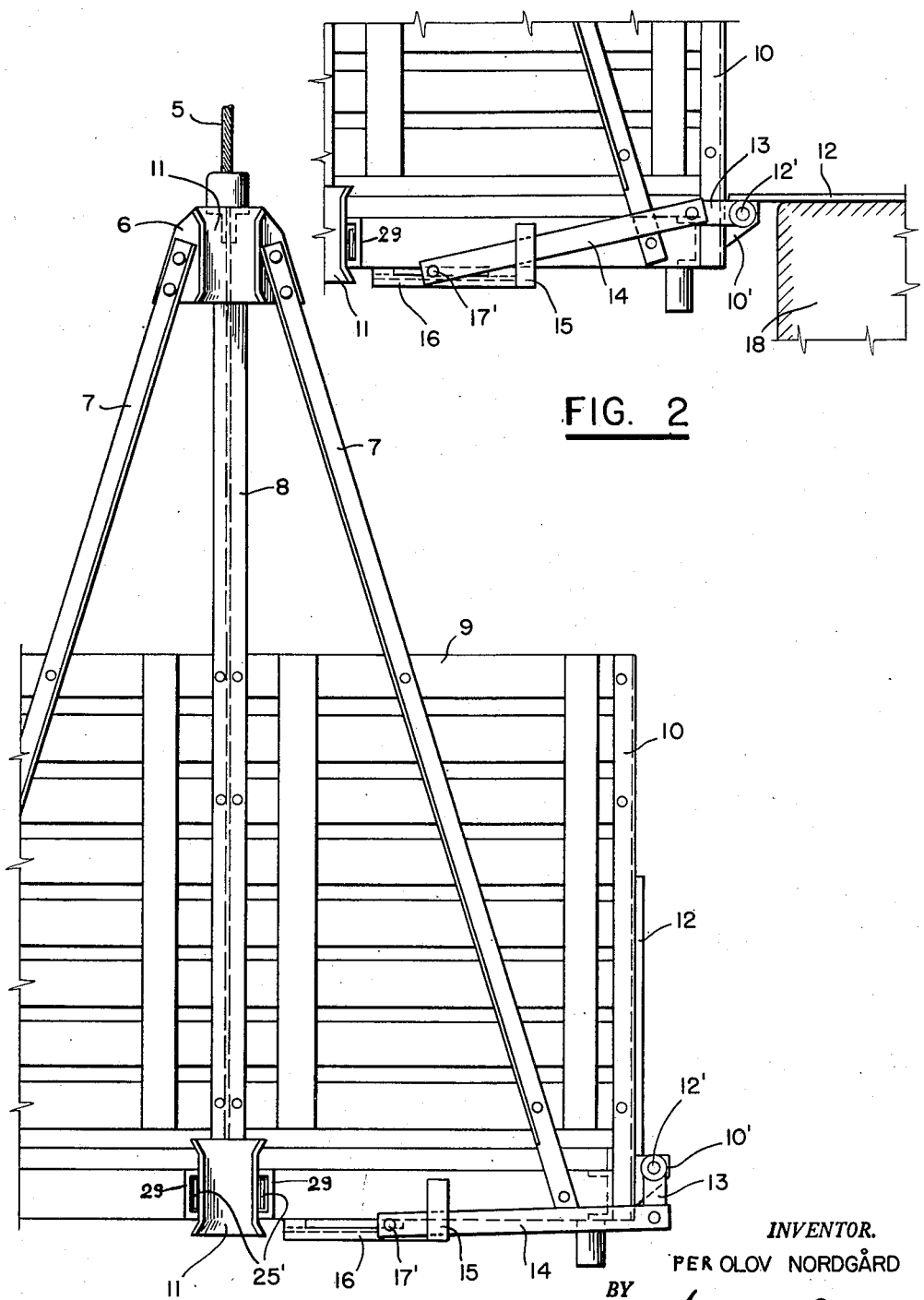
Dec. 4, 1956     P. O. NORDGÅRD     2,772,753
LIFT STAGE AND CAGE ASSEMBLY
Filed Dec. 15, 1951     2 Sheets-Sheet 1
INVENTOR.
PER OLOV NORDGÅRD
ATTORNEY

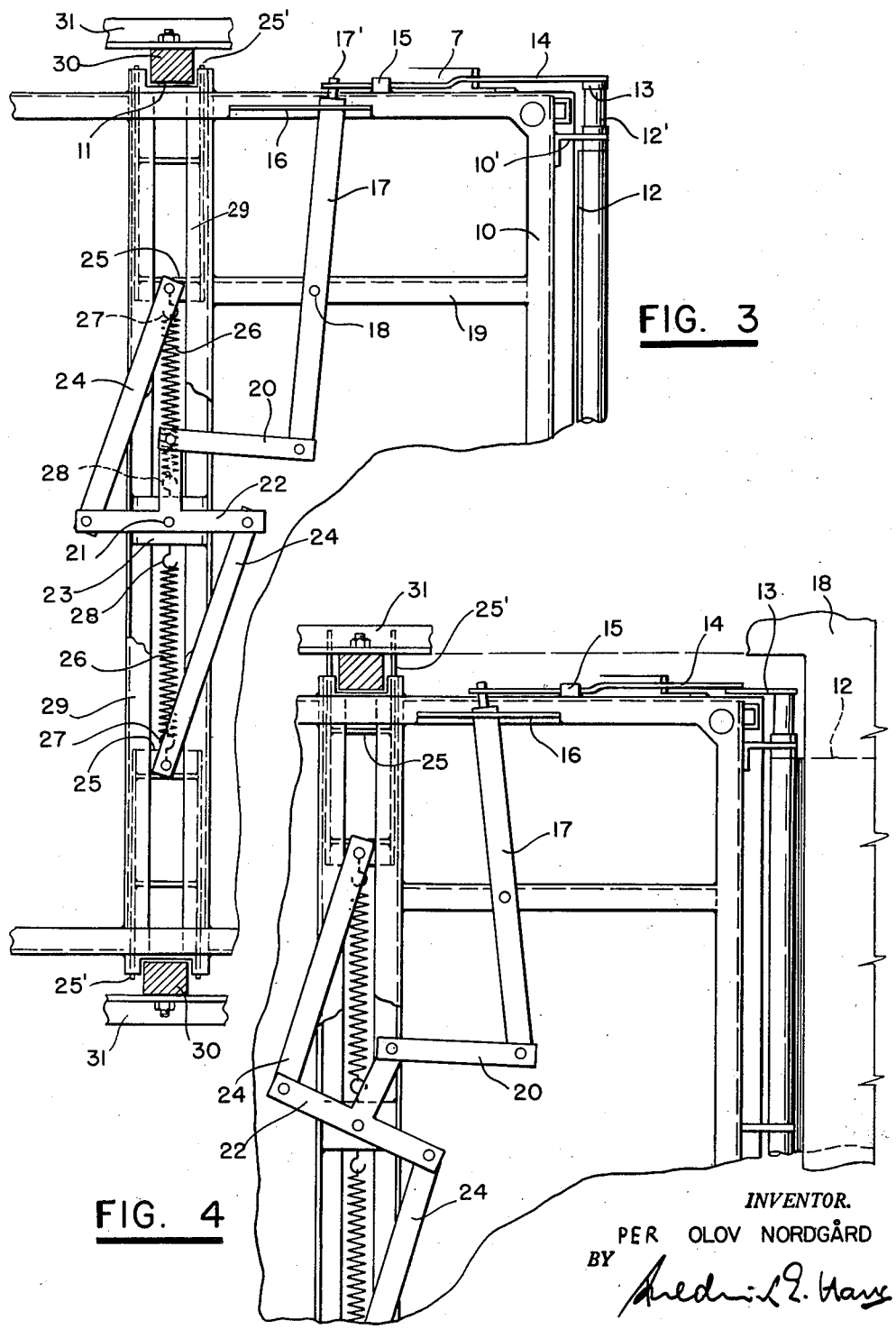

2,772,753

LIFT STAGE AND CAGE ASSEMBLY

Per O. Nordgård, Arboga, Sweden

Application December 15, 1951, Serial No. 261,817

5 Claims. (Cl. 187—76)

The present invention relates to a lift stage and cage assembly, particularly to a lift stage and cage assembly for lifting or lowering persons and loads to and from a selected level in a building structure.

Lift stage and cage assemblies of the general type above referred to, are frequently equipped with a gang-plank to facilitate the loading and unloading of the cage. This gang plank is pivoted against one of the walls of the cage when it is not in use for instance, when the cage is lifted or lowered in the stage. When the cage is brought to a stop in front of an open door or other selected position of loading or unloading, the plank is tilted outwardly so that it rests with its free end upon a part of the building structure adjacent to the cage.

With lift stage and cage assemblies of this type, there is always the danger that a person may enter or leave the cage or attempt to load or unload the cage when it is not properly secured. As a result, serious injuries may occur when the cage suddenly moves away during a loading or unloading operation. Furthermore, a movement of the cage with the gang-plank pivoted outwardly may result in damage to the cage or the plank as protruding parts of the cage or the plank may be caught by parts of the lift stage.

Accordingly, one of the objects of the present invention is to provide safety means which secure the cage in its position when and while the gang-plank is tilted outwardly, or in other words when and while it is in its position of use.

Another more specific object of the invention is to provide locking means coacting with the gang-plank which automatically lock the cage to a stationary part of the building structure when the gang-plank is tilted outwardly and which are automatically released when the gang-plank is swung back against the cage.

The arrangement according to the invention affords the advantage that the cage is secured in its position within the lift stage whenever the gang-plank is placed in a position of use, irrespectively of and in addition to any other safety means which may be provided to prevent accidental or undesired movements of the cage thereby greatly increasing the safety of the use of a cage.

Other and further objects, features and advantages of the invention will be pointed out hereinafter and set forth in the appended claims forming part of the application.

In the accompanying drawing a now preferred embodiment of the invention is shown by way of illustration and not by way of limitation.

In the drawing:

Fig. 1 is an elevational side view of a cage assembly according to the invention showing the gang-plank in its retracted position.

Fig. 2 is a fragmentary view of Fig. 1 showing the gang-plank in its operative or swung-out position.

Fig. 3 is a bottom view, partly in section, of the lift stage and cage assembly, the gang-plank being shown in the position of Fig. 1, and Fig. 4 is a fragmentary view of Fig. 3 showing the gang-plank in the operative position of Fig. 2.

Referring now to the figures in detail, the cage is lowered and lifted by cables 5 from which it is suspended by means of a member 6. T-bars 7 and 8 extending from this member support the cage proper the walls of which consist of a plurality of horizontal bars 9 joined by vertical corner posts 10. The cage is guided in the stage by an upper and a lower channeled guide member 11. These guide members are slidably guided in rails 30 which are secured to a suitable part of the building structure indicated as a girder 31.

The cage further comprises a gang-plank 12 which is pivoted by means of a shaft 12' to a bracket 10' extending from corner posts 10 on the side of the cage at which the cage is to be entered. Pivot shaft 12' mounts a lever 13 pivoted to a lever 14 slidably guided in a slotted bracket 15 secured to the cage. The free end of lever 14 is in engagement with a pin 17' slidably guided in a slot of a guide member 16 also secured to the cage.

As appears from the previous description, the afore-described linkage system permits to swing the gang-plank either into the inactive position of Fig. 1 in which it is substantially parallel with corner posts 10 or into the operative position of Fig. 2 in which it is at substantially a right angle to posts 10. In this latter position, the forward end of the gang-plank should be visualized as resting upon a floor of the building structure, to provide convenient access to the cage.

It will be noted from a comparison of Figs. 1 and 2 that as a result of the movement of the gang-plank from the position of Fig. 1 into the position of Fig. 2, pin 17' is displaced in its guide slot. This displacement of the pin is used to control the automatic locking means according to the invention.

Pin 17' extends from a lever 17 pivoted by means of a pivot pin 18 to a bar 19 forming part of the bottom structure of the cage. The respective end of lever 17 is pivoted to a lever 20 which in turn is pivoted to one arm of a T-lever 22. The T-lever is pivoted by a pivot pin 21 to a bracket 23 forming part of or fixed to the bottom structure of the cage. Each end of the cross-arm of lever 22 is pivoted to one end of a lever 24 the other end of which is pivoted to a locking member 25. The two locking members 25 are slidably guided in two U-shaped bars 29 secured to the cage or forming part of the bottom structure thereof and extending across the width of the cage. Each of the locking members is substantially U-shaped. The side branches of the locking members form locking noses 25' which may either occupy a position substantially withdrawn into the U-shaped bars 29 as seen in Fig. 3, or a position protruding from U-bars 29 as seen in Fig. 4. A loaded spring 26 attached with its ends to hooks 27 and 28 extending from bracket 23 and locking members 25 respectively, urges the locking members into the withdrawn position of Fig. 3.

The operation of the lift stage and cage assembly as hereinbefore described, is as follows:

Let it be assumed that the gang-plank 12 is in the position of Figs. 1 and 3. All the links and levers associated with the gang plank and controlled by the pivotal position thereof and also the locking noses 25', then occupy the position of Fig. 3.

When the gang-plank is tilted downwardly into the position of Fig. 2 or 4, the resulting displacement of pin 17' is transmitted through levers 17 and 20 to T-lever 22. This latter lever is turned into the position of Fig. 4 thereby causing locking noses 25' to protrude beyond U-bars 29, or in other words beyond the outline of the cage. In this position noses 25' overlie the girders 31 thereby securing the cage in its position.

As is evident from the previous description, return of the gang-plank into the position of Figs. 1 and 3 effects a withdrawal of the locking noses into the position of Fig. 3 thereby automatically releasing the cage for lifting or lowering in the stage.

What is claimed, is:

1. A lift stage and cage assembly comprising a cage, a gang-plank hinged to the cage and movable between a position substantially within the outline of the cage as seen in the direction of the up and down movement of the cage within the stage and a position laterally extending from the cage, locking means mounted on the cage movable between a position laterally protruding from the cage and a position withdrawn within the outline of the cage, and transmission means operatively coupling the gang-plank with said locking means for control of the latter by the position of the gang-plank so that the locking means are in the protruding position when the gang-plank is extending from the cage and in the withdrawn position when the gang-plank is situated within the outline of the cage; and the said lift stage comprising support means engageable with said locking means in the protruding position thereof thereby supporting the cage relative to the stage when the said gang-plank is swung outwardly.

2. A lift stage and cage assembly comprising a cage having a bottom wall and side walls, a gang-plank hinged to one of the side walls of the cage and movable between a position substantially parallel to the respective side wall and a position laterally extending therefrom, locking means mounted on the cage movable between a position laterally protruding from the cage and a position withdrawn within the outline of the cage as seen in the direction of the up and down movement thereof within the stage, and linkage means operatively coupling the locking means with the gang-plank for transmitting a pivotal movement of the gang-plank to the locking means, the said linkage means including an input lever connected with the gang-plank and an output lever connected with the locking means for moving the latter into the protruding position by movement of the gang-plank into its laterally extending position and for moving the locking means into the withdrawn position by movement of the gang-plank into its position within the outline of the cage; and said stage comprising support means engageable with the locking means in the protruding position thereof for supporting the cage within the stage when said gang-plank is swung outwardly.

3. A lift stage and cage assembly comprising a cage having a bottom wall and side walls, a gang-plank hinged to one of the side walls of the cage and movable between a position substantially parallel to the respective side walls and a position laterally extending therefrom, two locking bars mounted axially slidable on the cage between a position laterally protruding from the cage and withdrawn within the outline of the cage as seen in the direction of the up and down movement of the cage within the stage, and linkage means operatively coupling the locking means with the gang-plank for transmission of the movement of the gang-plank to the locking means, the said linkage means comprising a lever linked with each end to one of said bars and pivotally mounted on said cage for axially displacing both said bars by a rotation of said lever, a second lever linked to said gang-plank, and intermediate lever means operatively coupled with said second lever and said pivotal lever so as to rotate the latter for movement of the bars into said protruding position upon placement of the gang-plank into its position extending from the cage and to rotate said pivotal lever for movement of the bars into said withdrawn position upon placement of the gang-plank into its position parallel to the respective side wall of the cage; and the said lift stage comprising support means engageable with said bars in the protruding position thereof for supporting the cage within the stage when said gang-plank is swung outwardly.

4. An assembly according to claim 3, wherein the said intermediate coupling means comprise a two-arm lever pivotally mounted on said cage, one arm of the said lever being linked to the lever linked to the gang-plank and a lever linked with one end to said pivotal lever linked to said bars and with the other end to the second arm of the two-arm lever in movement transmitting arrangement.

5. An assembly according to claim 3, in combination with spring means coacting with said linkage means and loaded to bias the gang-plank into its position parallel to the respective side wall of the cage and the locking bars into their withdrawn position.

References Cited in the file of this patent

UNITED STATES PATENTS

| | | |
|---|---|---|
| 404,808 | Wall | June 4, 1889 |
| 1,497,501 | Graboski | June 10, 1924 |